United States Patent [19]

Fortune

[11] Patent Number: 5,575,838
[45] Date of Patent: Nov. 19, 1996

[54] CONDITIONING FLUID

[76] Inventor: John Fortune, 27 Wroxton Road, London SE15 2BN, England

[21] Appl. No.: 331,706

[22] Filed: Oct. 31, 1994

[30] Foreign Application Priority Data

Mar. 3, 1994 [GB] United Kingdom ............... 9404048

[51] Int. Cl.$^6$ .................. C09G 1/18; C09D 191/00
[52] U.S. Cl. ................. 106/9; 106/244; 106/252
[58] Field of Search ................. 106/9, 244, 252

[56] References Cited

U.S. PATENT DOCUMENTS 4,273,584  6/1981  D'Angelo et al. ............... 106/9
4,810,291  3/1989  Osberghaus et al. ............... 106/9
5,433,890  7/1995  Meyer et al. ............... 106/9

*Primary Examiner*—David Brunsman
*Attorney, Agent, or Firm*—Baker & Daniels

[57] ABSTRACT

A conditioning fluid comprises between one and three parts by volume of silicone fluid and between two and six parts by volume of vegetable oil in a solvent comprising D-limonene and white spirit.

4 Claims, No Drawings

CONDITIONING FLUID

BACKGROUND OF THE INVENTION

This invention relates to a fluid for conditioning plastics materials. Throughout this specification the term 'conditioning' should be taken to include one or more of the following functions, namely cleaning, polishing, restoring dull faded colours, covering light scratches, waterproofing and protecting.

There is a considerable market for cleaning and polishing fluids for enhancing the appearance of motor cars. In particular, there are many formulations for restoring and polishing the paintwork of motor cars. Nowadays, however, many car bodywork panels (such as bumpers, roof panels and side bars) are made of plastics materials, and known paintwork formulations are unsuitable for conditioning such panels.

SUMMARY OF THE INVENTION

The present invention provides a conditioning fluid comprising between one and three parts by volume of silicone fluid and between two and six parts by volume of vegetable oil.

Preferably, the conditioning fluid further comprises a solvent for the silicone fluid and the vegetable oil. Advantageously, the solvent has a volume that is at least twice that of the combined volume of the silicone fluid and the vegetable oil.

The solvent may be constituted by D-limonene and white spirit. Conveniently, there are four parts by volume of D-limonene and ten parts by volume of white spirit.

In a preferred embodiment, the conditioning fluid is 20% by volume of vegetable oil, 10% by volume of silicone oil, 20% by volume of D-limonene and 50% by volume of white spirit.

The vegetable oil may be rapeseed oil, corn oil, sunflower oil or nut oil, and the silicone fluid is of 1000 viscosity.

DESCRIPTION OF PREFERRED EMBODIMENTS

The invention will now be described in greater detail, by way of example, with reference to the following example.

EXAMPLE

A conditioning fluid is made by mixing together:

200 mil vegetable oil;
100 mil silicone fluid;
200 mil D-limonene; and
500 mil white spirit.

The vegetable oil can be, for example, rapeseed oil, corn oil, sunflower oil or nut oil, and the silicone fluid is of 1000 viscosity.

The functions of the four ingredients are as follows:

(i) Vegetable Oil

Vegetable oil reduces surface wear and gives a depth of natural colour to plastics materials such as vinyls. It also provides a waterproofing function, and enhances the appearance of plastics materials to make them look new. Vegetable oil is particularly effective on plastics materials that are black.

(ii) Silicone Fluid

Silicone fluid is a transparent oil with polishing properties. It also has a waterproofing function, is durable, and it negates the natural stickiness of the vegetable oil. It promotes smooth 'touch' finish to the surfaces of plastics materials to which it is applied.

(iii) D-limonene

D-limonene is a mild solvent with cleaning properties. It has a powerful odour of citrus fruits (oranges and lemons), which negates the bland odour of the other ingredients.

(iv) White Spirit

White spirit is a mild solvent with cleaning properties. Its main function is to dilute the vegetable oil and silicone fluid to form a creamy mixture that can easily be applied to, and spread over, the surfaces of plastics materials.

As mentioned above, the proportions of the ingredients can be varied, the effects of which are as follows:

(a) Varying the proportion of vegetable oil results in variations in the depth of colour produced by the conditioning fluid. Thus, increasing the proportion of vegetable oil in the conditioning fluid will result in an increase in the resultant depth of colour, albeit with an undesirable increase in the stickiness of the finish. Any reduction in the concentration of vegetable oil should, however, be balanced by a corresponding increase in the concentration of silicone fluid, thereby to maintain the 'gloss' appearance of the surface to which the conditioning fluid is applied. However, even small increases in the proportion of vegetable oil will increase the viscosity of the conditioning fluid, and this is not desirable.

(b) Increasing the proportion of silicone fluid has the advantages of increasing the durability of the finish, but will increase the cost of the conditioning fluid (as silicone fluid is the most expensive of the ingredients). Such a increase does, however, have the disadvantage of increasing the viscosity of the conditioning fluid. It will also result in an increase in the high gloss finish which results from the application of the conditioning fluid. The durability and waterproofing properties of the conditioning fluid will also be increased.

(c) Varying the proportion of D-limonene merely affects the odour of the finished product. Any reduction in the concentration of D-limonene should be compensated for by an increase in the proportion of white spirit. White spirit is not, as indicated above, an essential ingredient. It is used principally because it is a cheap solvent. Again, D-limonene is not an essential ingredient—it is included in the optimum formulation to negate the unpleasant odour of the white spirit.

It will be apparent, therefore, that the only two essential ingredients are the vegetable oil and the silicone fluid. In order to provide a conditioning fluid that is easy to apply, however, at least one solvent should be included. The two essential ingredients can each vary by up to 50% from its optimum concentration, with the proviso that an increase in the proportion of vegetable oil should be balanced by a decrease in the proportion of silicone oil, and vice versa.

In use, the conditioning fluid is applied to the plastics material surface to be conditioned using a soft cloth, preferably one such as a cotton cloth or a J-cloth, which does not have loose fibres. This surface should preferably be dry (though this is not essential) with any surface dirt (such as mud) removed. If a gloss finish is required, the conditioning fluid is left to dry. For satin or matt finishes, the surface is buffed before the conditioning fluid dries, thereby reducing the gloss finish to a satin or matt finish depending upon the length of time the fluid is left to dry before buffing commences.

The conditioning fluid described above can be used on all plastics materials such as ABS, acrylics, polypropylene, polystyrene, HDPE, vinyl materials such as polyvinylchloride, thermosetting plastics materials and melamine formaldehyde.

I claim:

1. A conditioning fluid comprising between 1 and 3 parts by volume of silicone fluid and between 2 and 6 parts by volume of vegetable oil, and a solvent for said silicone fluid and said vegetable oil, said solvent having a volume that is at least twice that of the combined volume of the silicone fluid and the vegetable, said solvent being constituted by D-limonene and white spirit in the ratio of 4 parts by volume of D-limonene and 10 parts by volume of white spirit, said vegetable oil being 20 percent by volume, said silicone oil being 10 percent by volume, said D-limonene being 20 percent by volume, and said white spirit being 50 percent by volume.

2. A conditioning fluid as claimed in claim 1, wherein the vegetable oil is rapeseed oil, corn oil, sunflower oil or nut oil, and the silicone fluid is of 1000 viscosity.

3. A conditioning fluid for plastics materials consisting of 10 percent to 30 percent by volume of vegetable oil, 5 percent to 15 percent by volume of silicone oil, and a solvent for said vegetable and silicone oils, said solvent being constituted by D-limonene and white spirit, and said solvent having a volume that is at least twice that of the combined volume of the said vegetable and silicone oils.

4. A conditioning fluid for plastics materials consisting primarily of between 2 and 6 parts by volume of vegetable oil, between 1 and 3 parts by volume of silicone oil, and a solvent for said vegetable and silicone oils, said solvent being constituted by D-limonene and white spirit, and said solvent having a volume that is at least twice that of the combined volume of said vegetable and silicone oils.

* * * * *